United States Patent [19]
Ishihara et al.

[11] Patent Number: 5,952,450
[45] Date of Patent: Sep. 14, 1999

[54] CROSSLINKED POLYCARBONATE AND POLYLACTIC ACID COMPOSITION CONTAINING THE SAME

[75] Inventors: Jiro Ishihara; Hiroki Kuyama; Eiichi Ozeki, all of Kyoto; Takeshi Ishitoku, Yokohama; Masahide Tanaka, Ichihara; Naoya Sakamoto, Tokyo, all of Japan

[73] Assignees: Shimadzu Corporation, Kyoto; Mitsui Chemicals, Inc., Tokyo, both of Japan

[21] Appl. No.: 09/127,075

[22] Filed: Jul. 31, 1998

[30] Foreign Application Priority Data

Aug. 6, 1997 [JP] Japan ..................... 9-225673
Aug. 27, 1997 [JP] Japan ..................... 9-246173

[51] Int. Cl.⁶ .................................................. C08G 64/00
[52] U.S. Cl. ................................................ 528/196
[58] Field of Search ............................. 528/196

[56] References Cited

U.S. PATENT DOCUMENTS

| | | | |
|---|---|---|---|
| 3,897,392 | 7/1975 | Haupt et al. ............... | 528/196 |
| 5,143,997 | 9/1992 | Endo et al. ................. | 528/60 |
| 5,527,879 | 6/1996 | Nakae et al. ............... | 528/371 |
| 5,744,653 | 4/1998 | Ito et al. .................... | 568/720 |

FOREIGN PATENT DOCUMENTS

| | | |
|---|---|---|
| 0 540 182 A2 | 5/1993 | European Pat. Off. . |
| 0 646 613 A2 | 4/1995 | European Pat. Off. . |
| 195 06 549 A1 | 8/1995 | Germany . |

OTHER PUBLICATIONS

Abstract of Japanese Patent Publ. No. 07109413A; dated Apr. 25, 1995.

*Primary Examiner*—Terressa Mosley
*Attorney, Agent, or Firm*—Nikaido Marmelstein Murray & Oram LLP

[57] ABSTRACT

A crosslinked polycarbonate is obtained by polycondensation of diol (A), trivalent or more polyhydric alcohol (B) whose arbitrary two hydroxy groups are not in the positional relationship of 1,2-disubstitution or 1,3-disubstitution, and carbonyl component (C) such as carbonic acid diesters. In the polycondensation step, no side reaction does not occur.

This crosslinked polycarbonate is used as a modifier for polylactic acids. The brittleness of the polylactic acid is improved while maintaining mechanical strength, thermostability, and transparency.

22 Claims, 10 Drawing Sheets

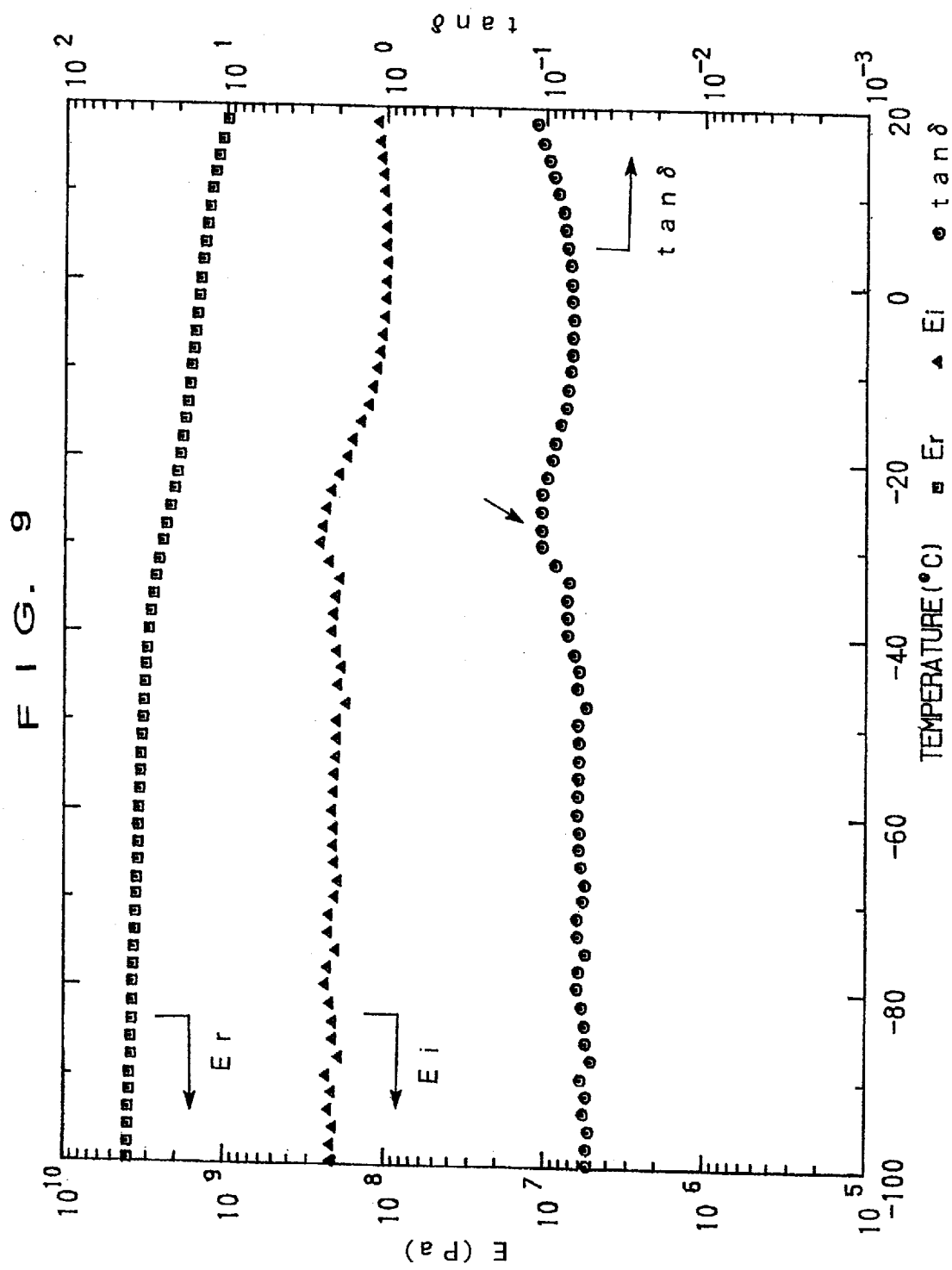

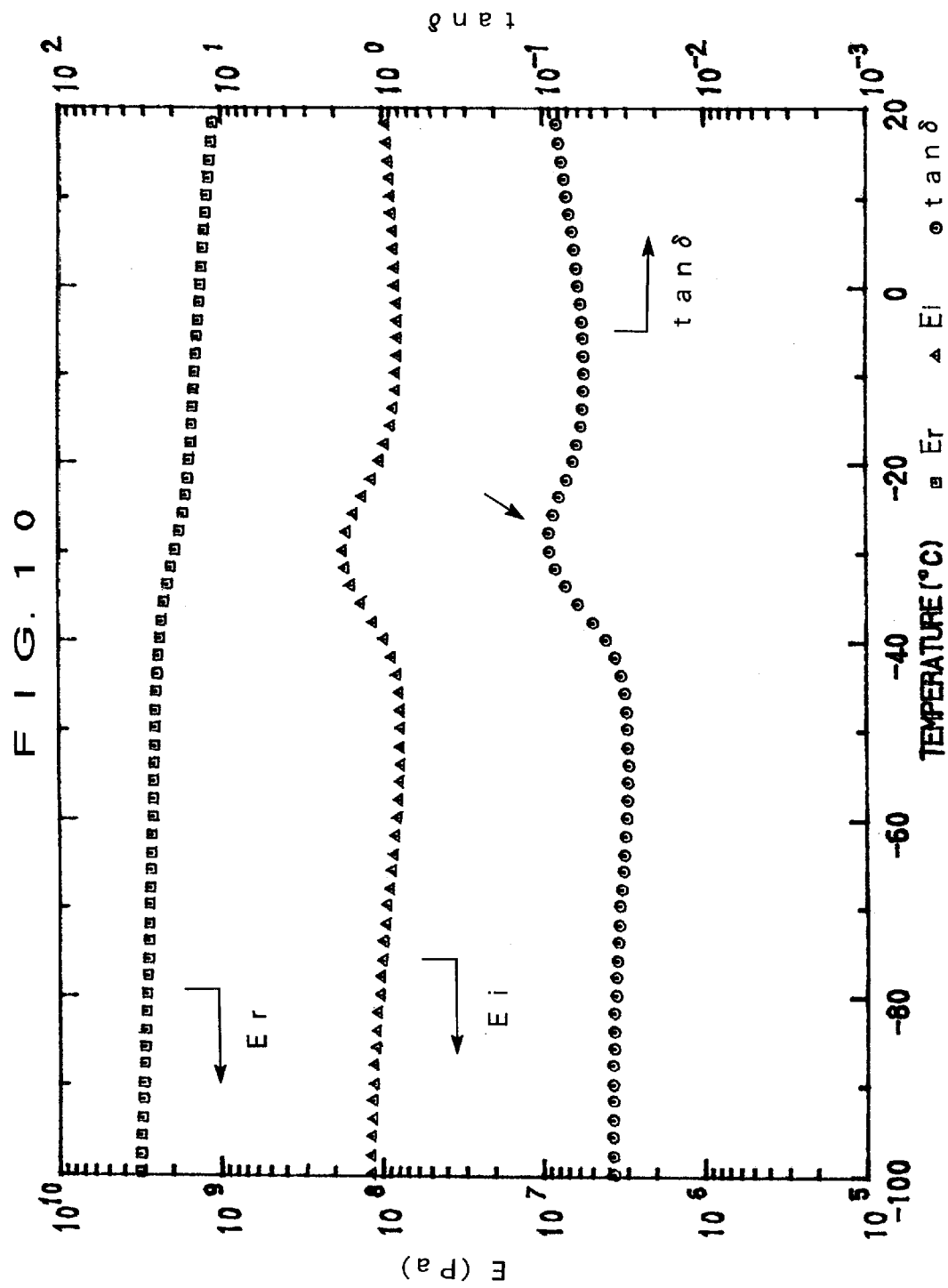

CROSSLINKED POLYCARBONATE AND POLYLACTIC ACID COMPOSITION CONTAINING THE SAME

BACKGROUND OF THE INVENTION

1. Field of the Invention

The present invention relates to a novel crosslinked polycarbonate and a process for producing the same. This crosslinked polycarbonate is useful as a modifier for polyesters, polyurethanes etc. and particularly useful as a modifier for polylactic acids important as biodegradable resins.

Further, the present invention relates to a polylactic acid type resin composition containing said crosslinked polycarbonate as a modifier. The polylactic acid type resin composition of the present invention is excellent in impact resistance, possesses practically adequate strength, flexibility and transparency and is utilized in packaging materials and a wide variety of molded articles.

The polylactic acid referred to in the present specification is intended to mean both homopolymers of lactic acid and copolymers of lactic acid.

2. Description of Related Art

As crosslinked polycarbonates, there are known polycarbonates produced by reacting diols and trihydric or more polyhydric alcohols such as trimethylolpropane, pentaerythritol etc. with carbonic acid diesters.

Japanese Laid-Open Patent Publication No. 3-220,233/1991 discloses crosslinked polycarbonates obtained by transesterification between polycarbonate diol and trimethylolpropane or pentaerythritol.

Japanese Laid-Open Patent Publication No. 6-73,173/1994 discloses crosslinked polycarbonates obtained by reacting a carbonyl component, a branched diol, and a tetrahydric to hexahydric or more polyhydric alcohol such as ditrimethylolpropane or sorbitol.

However, any trihydric or more polyhydric alcohols used as monomer components in the above-described conventional crosslinked polycarbonates contain 1,2-diol or 1,3-diol structural units. In a report of D. B. Pattison (J. Am. Chem. Soc., 79, 3455 (1957)), it is suggested that trimethylolpropane etc. with 1,3-diol structural units are subject to side reactions so that they are converted via cyclic carbonates into cyclic ethers by decarboxylation, so they are not necessarily suitable as the starting monomer component for crosslinked polycarbonates.

From a viewpoint of natural environmental protection in recent years, there is demand for biodegradable resin and molded articles thereof decomposed in the natural environment, and the research and development of biodegradable resins such as aliphatic polyesters etc. are actively conducted. In particular, polylactic acid type polymers not only have a melting point as considerably high as 170 to 180° C. but are also excellent in transparency, so these are expected to be promising packaging materials or starting materials for molded articles making use of transparency. However, polylactic acids suffer from the drawback of poor impact resistance and brittleness due to their rigid molecular structure, so there is demand for improvements in these polylactic acid type polymers.

Generally, a polycarbonate resin made of bisphenol A as the starting material is transparent and superior in mechanical characteristics such as impact resistance and tensile strength, and there is increasing utilization thereof as materials directed mainly to industrial materials for general-purpose products. However, similar to other plastic products, this resin is not decomposed under the natural environment either, and the heat of combustion thereof upon thermal disposal is so great that a social problem arises as a cause of environmental destruction.

On the other hand, Japanese Laid-Open Patent Publication No. 8-187,090/1996 discloses aliphatic polyester carbonates as resins capable of biodegradation by microorganisms of the genus Pseudomonas. Further, Japanese Laid-Open Patent Publication Nos. 7-53,693/1995 and 7-53,695/1995 disclose that high-molecular-weight aliphatic polyester carbonates obtained from aliphatic dicarboxylic acids, aliphatic diols and diallyl carbonates are applicable to packaging materials and molded articles. However, the melting points of these aliphatic polyester carbonates are as low as 90 to 110° C. although their biodegradability has been confirmed. In addition, aliphatic polyester carbonates are generally poor in mechanical strength including tensile strength, and even their highest tensile strength is as low as 40.9 MPa, as described in Japanese Laid-Open Patent Publication No. 8-134,198/1996, so their utilities are limited in cases where they are used solely in packaging materials or molded articles.

Japanese Laid-Open Patent Publication No. 8-27,362/1996 describes an example of the modification high-molecular-weight of polyester carbonates by fusion-mixing thereof with bacterially degradable poly-β-hydroxybutyric acid (PHB) to utilize the rigidity of PHB. However, the tensile strength of even those with the highest improvement in rigidity is 32 MPa which is not sufficient as molded articles requiring strength. Further, because PHB is an opaque resin, it is highly estimated that the resulting molded article is also opaque.

Japanese Laid-Open Patent Publication No. 7-82,369/1995 describes a process for producing a bisphenol A type polycarbonate/lactide copolymer. According to this publication, the melting point of the resulting resin is as high as 124 to 176° C. and its degradability in the natural environment has been confirmed. However, any of the resulting resin is whitened and opaque, thus limiting utilities thereof as packing materials.

SUMMARY OF THE INVENTION

Accordingly, an object of the present invention is to provide a novel crosslinked polycarbonate obtained using a trihydric or more polyhydric alcohol which does not cause side reactions in a polycondensation step as a monomer component to solve the above-described problems of the prior art. Another object of the present invention is to provide a process for producing this novel crosslinked polycarbonate.

A further object of the present invention is to provide a polylactic acid type resin composition with improvements in brittleness of the polylactic acid while maintaining such characteristics of polylactic acid as excellent biodegradability, mechanical strength, thermostability and transparency as well as a process for producing the same to solve the above-described problems of the prior art. Another further object is to provide packaging materials and various molded articles consisting of this polylactic acid type resin composition.

The present inventors, as a result of their eager study, found that a crosslinked polycarbonate can be synthesized while side reactions such as cyclization, decarboxylation etc. are inhibited by using a starting monomer component having an epoxy compound added to a polyhydric alcohol such as trimethylolpropane, pentaerythritol etc. as a trihydric or more polyhydric alcohol, and the present inventors thereby arrived at the present invention.

The present inventors, as a result of their further extensive study, found that the brittleness of the polylactic acid can be improved while maintaining transparency by using said crosslinked polycarbonate compound as a modifier, and they thereby arrived at the present invention. Accordingly, when said crosslinked polycarbonate compound is used as a modifier, it is possible to obtain a biodegradable polylactic acid type resin composition excellent in mechanical strength and transparency with brittleness significantly improved.

That is, the present invention is directed to a crosslinked polycarbonate obtained by polycondensation of (A) a diol (B) a trivalent or more polyhydric alcohol whose arbitrary two hydroxy groups are not in the positional relationship of 1,2-disubstitution or 1,3-disubstitution, and (C) a carbonyl component (carbonyl group-containing compound) selected from the group consisting of carbonic acid diesters, phosgene and equivalents thereof.

Further, the present invention is directed to a process for producing a crosslinked polycarbonate, comprising conducting polycondensation of (A) a diol, (B) a, trivalent or more polyhydric alcohol whose arbitrary two hydroxy groups are not in the positional relationship of 1,2-disubstitution or 1,3-disubstitution, and (C) a carbonyl component (carbonyl group-containing compound) selected from the group consisting of carbonic acid diesters, phosgene and equivalents thereof.

Here, the equivalents refer to compounds such as chloroformate, carbodiimidazole etc. which upon reaction with a polyhydric alcohol, give polycarbonates.

According to the process for producing a crosslinked polycarbonate in the present invention, polyhydric alcohol (B) whose arbitrary 2 hydroxy groups are not in the positional relationship of 1,2-disubstitution or 1,3-disubstitution is used as trivalent or more polyhydric alcohol (B) as described above, so side reactions such as cyclization, decarboxylation etc. are prevented in the polycondensation step, and thus the process of the present invention is excellent as a process for producing a crosslinked polycarbonate.

The crosslinked polycarbonate of the present invention is useful as a modifier for polyesters, polyurethanes etc. and particularly useful as a modifier for polylactic acids important as biodegradable resin.

The present invention is also directed to a polylactic acid type resin composition comprising a polylactic acid and the above crosslinked polycarbonate.

Further, the present invention is directed to a process for producing a polylactic acid type resin composition, comprising fusion-mixing a polylactic acid with the above crosslinked polycarbonate. And further, the present invention is directed to a process for producing a polylactic acid type resin composition, comprising conducting polymerization of a polylactic acid in the presence of the above crosslinked polycarbonate.

According to the present invention, a biodegradable polylactic acid type resin composition significantly excellent in impact resistance can be provided because the above crosslinked polycarbonate has been incorporated as a modifier for the polylactic acid.

Packaging materials and various molded articles having practically adequate mechanical strength, which could not be realized by the hitherto known biodegradable resin, can be obtained from the polylactic acid type resin composition of the present invention. For example, it is possible to obtain films, sheets, fibers, various vessels, various parts, or other molded articles.

BRIEF DESCRIPTION OF THE DRAWINGS

FIG. 9 is a graph showing the result of dynamic viscoelasticity measurement in Example 16.

FIG. 10 is a graph showing the result of dynamic viscoelasticity measurement in Example 17.

DETAILED DESCRIPTION OF THE INVENTION

Figure 1:
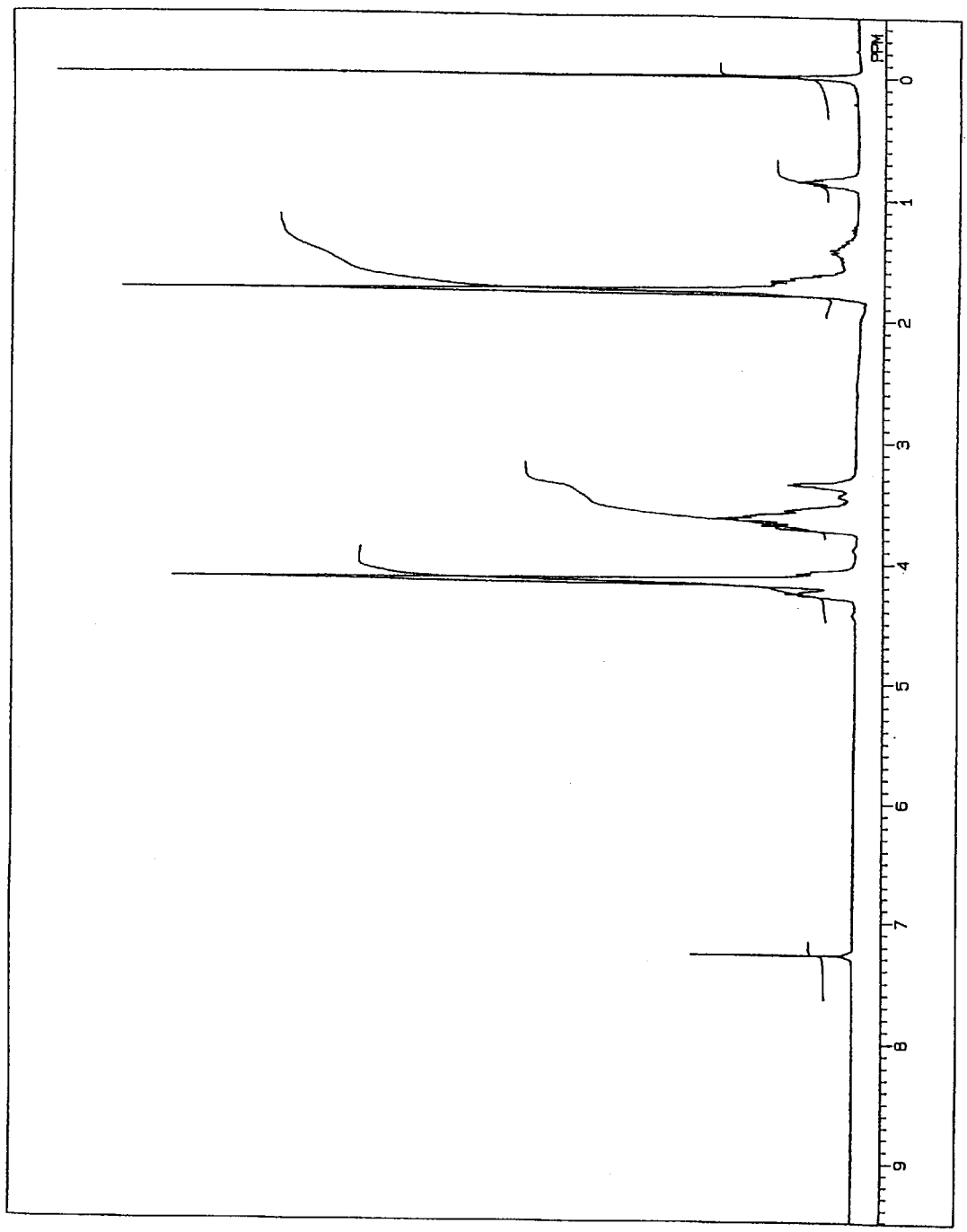
FIG. 1 is an NMR chart of crosslinked polycarbonate A obtained in Example 1.

Hereinafter, the crosslinked polycarbonate of the present invention is described.

Diol (A) used in the present invention is not particularly limited, and any diols used conventionally as a starting material for synthesis of polycarbonates can be used, but preferably used are diols represented by the following general formula (I):

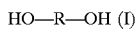

HO—R—OH (I)

wherein R is a C4 to C20 alkylene group, may include a phenylene group and/or an ether linkage, or may have formed a ring structure. If the number of carbons in the alkylene group represented by R is 3 or less, it may be hard to obtain the effect of improving the impact resistance of the resulting polylactic acid type resin composition. On the other hand, if the number of carbons therein is 21 or more, compatibility of polycarbonate with polylactic acid is lowered so that the transparency of the resulting polylactic acid type resin composition may be lost.

Such diol (A) includes e.g. 1,4-butanediol, 1,6-hexanediol, 1,8-octanediol, 1,3-bis(2-hydroxyethoxy)benzene, 1,4-bis(2-hydroxyethoxy)benzene, neopentylglycol, 3-methyl-1,5-pentanediol, 1,4-cyclohexanediol, 1,4-cyclohexanedimethanol, diethylene glycol, dipropylene glycol, triethylene glycol etc. These may be used solely or in combination thereof.

Particularly preferable examples of such diol (A) are more preferably 1,4-butanediol, neopentyl glycol, 1,4-cyclohexanedimethanol etc. for availability of starting materials, the obtained physical properties etc.

Trivalent or more polyhydric alcohol (B) is a trihydric or more polyhydric alcohol whose arbitrary two hydroxy groups are not in the positional relationship of 1,2-disubstitution or 1,3-disubstitution.

As a non-limiting example, mention is made of polyhydric alcohol (B) having at least one molecule of ethylene oxide and/or propylene oxide added to each of "n" hydroxyl groups possessed by an "n"-hydric or more polyhydric alcohol ("n" is an integer of 3 or more).

As specific trihydric or more polyhydric alcohol (B), for example, mention can be made of polyhydric alcohol (B) having at least one molecule of ethylene oxide and/or propylene oxide added to each of hydroxyl groups of at least one polyhydric alcohol selected from the group consisting of trimethylolpropane, trimethylolethane, pentaerythritol, ditrimethylolpropane, dipentaerythritol, glycerin and sorbitol.

In view of the physical properties etc. of the resulting polymer, the number of added ethylene oxide and/or propylene oxide molecules is preferably 1 to 20 for every hydroxyl group in such a polyhydric alcohol.

When the crosslinked polycarbonate is used as a modifier for polylactic acids, the number of added ethylene oxide and/or propylene oxide molecules is preferably 1 to 5 for every hydroxyl group in the polyhydric alcohol. If the number of ethylene oxide or propylene oxide molecules added to one hydroxyl group is 6 or more, compatibility with the polylactic acid tends to be lowered.

This addition reaction can be easily carried out in a usual manner. The polyhydric alcohol (B) may be used solely or in combinations thereof.

In view of the availability of starting materials and the physical properties of the resulting polymer etc., more preferable examples of polyhydric alcohol (B) include: (1) an alcohol having 3 moles of ethylene oxide added to 1 mole of trimethylolpropane, (2) an alcohol having 4 moles of ethylene oxide added to 1 mole of pentaerythritol, etc.

Such alcohol(1) includes, for example, the following compound:

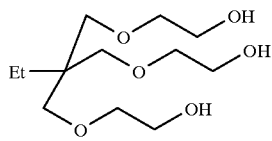

Such alcohol(2) includes, for example, the following compound:

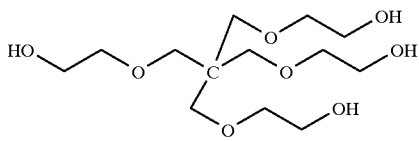

In the present invention, the arbitrary two hydroxy groups in the trihydric or more polyhydric alcohol (B) are not in the positional relationship of 1,2-disubstitution or 1,3-disubstitution, so side reactions such as cyclization, decarboxylation etc. are inhibited in the polycondensation step.

In the present invention, carbonyl compound (C) is selected from the group consisting of carbonic acid diesters, phosgene or equivalents thereof. Examples of such carbonyl compound (C) include carbonic acid diesters such as dimethyl carbonate, diethyl carbonate, diisopropyl carbonate, ethyl methyl carbonate, isopropyl methyl carbonate, ethyl isopropyl carbonate, diphenyl carbonate, ethylene carbonate, propylene carbonate etc.; chloroformates such as methyl chloroformate, ethyl chloroformate, phenyl chloroformate etc.; and phosgene etc.

More preferable examples of these carbonyl components (C) are dimethyl carbonate, diethyl carbonate, diphenyl carbonate etc. for availability of starting materials, reactivity, easy handling etc.

The molar ratio of diol (A) to polyhydric alcohol (B) in the crosslinked polycarbonate of the present invention is preferably in the range of (A):(B)=40:60 to 99:1. The molar ratio lies preferably in this range because of the solubility of the polymer and the performance thereof as a modifier. That is, if the molar ratio of polyhydric alcohol (B) exceeds 60, degree of crosslinking tends to become too high, thus readily making the solubility of the resulting polymer low. On the other hand, if the molar ratio of polyhydric alcohol (B) is less than 1, there are cases where the degree of crosslinking is so low that the performance of the resulting polymer as a modifier is insufficient. More preferable molar ratios are in the range of (A):(B)=70:30 to 98:2.

For the solubility of the polymer and the performance thereof as a modifier, it is preferable that the molecular weight of the crosslinked polycarbonate of the present invention is in the range of 2,000 to 100,000 in terms of polystyrene weight-average molecular weight by GPC. That is, if the weight-average molecular weight of the crosslinked polycarbonate for use as a modifier for polylactic acid is less than 2,000, there are cases where the crosslinked polycarbonate does not possess sufficient performance as a modifier for polylactic acids. On the other hand, if the weight-average molecular weight exceeds 100,000, there are cases where compatibility with polylactic acid is lowered. More preferable weight-average molecular weights are in the range of 3,000 to 80,000.

The molecular terminal of the crosslinked polycarbonate of the present invention may be a hydroxyl group, a carbonate, or a mixture thereof. However, if the crosslinked polycarbonate is used as a modifier for polymers such as polyesters, polyurethanes etc., its molecular terminal is preferably a hydroxyl group. The molecular terminal can be easily controlled by regulating the molar ratio of the total of hydroxyl groups possessed by diol (A) and trihydric or more polyhydric alcohol (B), and carbonyl component (C) in polymerization, or by post-treatment after polymerization.

Then, the process for producing the crosslinked polycarbonate is described.

The crosslinked polycarbonate of the present invention can be synthesized by polycondensation of diol (A), trihydric or more polyhydric alcohol (B) and carbonyl component (C) by any method known in the art. That is, these 3 types of monomers are polycondensed by reacting them for example at a temperature of about 50 to 200° C. at a pressure of about 5 to 2000 mmHg whereby the crosslinked polycarbonate can be obtained.

The molar ratio of diol (A) and trivalent or more polyhydric alcohol (B) charged is preferably in the range of (A):(B)=50:50 to 99:1 because of the solubility of the resulting polymer and the performance thereof as a modifier. The molar ratio is more preferably in the range of (A):(B)=60:40 to 98:2. Polycondensation of diol (A) with trihydric or more polyhydric alcohol (B) at said molar ratios can give the crosslinked polycarbonate with diol (A) and polyhydric alcohol (B) at a molar ratio in the range of (A):(B)=40:60 to 99:1 in the polymer.

It is preferable for the molecular weight of the resulting polycarbonate that the amount of carbonyl component (C) charged is 0.2 to 5 equivalents relative to the total of hydroxyl groups possessed by diol (A) and trivalent or more polyhydric alcohol (B). If the amount of carbonyl component (C) charged is less than 0.2 equivalent, the unreacted alcohol component tends to be present in excess and is hardly removed. On the other hand, if the amount of carbonyl component (C) charged exceeds 5 equivalents, the unreacted carbonyl component tends to be hardly removed. A preferable amount of carbonyl component (C) charged is 0.5 to 4 equivalents relative to the total of hydroxyl groups possessed by diol (A) and trihydric or more polyhydric alcohol (B).

The molecular terminal of the resulting crosslinked polycarbonate can be easily regulated by controlling the total amount of hydroxyl groups possessed by diol (A) and polyhydric alcohol (B) relative to carbonyl component (C). That is, if the amount of carbonyl component (C) charged is high, the resulting terminal is a carbonate group, while if the amount of carbonyl component (C) charged is low, the resulting terminal is a hydroxyl group.

In addition, the molecular terminal of the crosslinked polycarbonate can be controlled by adding an alcohol component, or by adding a dialkyl carbonate or a chloroformate, after polymerization was terminated.

Polymerization of the polylactic acid can be effected in the presence of the crosslinked polyearbonate whose molecular terminal was thus controlled. The crosslinked polycarbonate of the present invention can be produced in the manner as described above.

According to the present invention, a trihydric or more polyhydric alcohol (B) whose arbitrary two hydroxy groups are not in the positional relationship of 1,2-disubstitution or 1,3-disubstitution is used as a starting material for synthesis of the crosslinked polycarbonate, so side reactions such as cyclization, decarboxylation etc. are inhibited in the polycondensation step.

The acid type resin composition of the present invention comprising a polylactic acid and the above crosslinked polycarbonate is described as follows.

The polylactic acid can be synthesized in a method known in the art. That is, it can be synthesized by a direct polymerization method starting from lactic acid monomers (described in e.g. Japanese Laid-Open Patent Publication Nos. 59-96,123/1984, 7-33,861/1995 etc.) or a polymerization method of ring-opening a lactide i.e. a cyclic lactic acid dimer (described in e.g. U.S. Pat. No. 4,057,537, Polymer Bulletin, 14, 491–495 (1985) etc.).

In the case of the direct polymerization method from lactic acid monomers, it is possible to use L-lactic acid, D-lactic acid, DL-lactic acid or a mixture thereof. In the case of the ring-opening polymerization method, it is possible to use any lactide selected from L-lactide consisting of two L-lactic acid molecules, D-lactide consisting of two D-lactic acid molecules, meso-lactide consisting of L-lactic acid and D-lactic acid, or a mixture thereof.

In particular, if about 10% or more optical isomer is contained, polylactic acid crystallizability is reduced, and the resulting polylactic acid type resin composition is rendered more flexible. Such a polylactic acid type resin composition is utilized to obtain a molded body requiring flexibility.

In the present invention, the polylactic acid may be a homopolymer of lactic acid consisting of 100 mole-% lactic acid component, but it may also be a copolymer of lactic acid having lactic acid monomers or lactides copolymerized with other components copolymerizable therewith.

The other components copolymerizable with lactic acid monomers or lactides include, but are not limited to, dicarboxylic acids, polyhydric alcohols, hydroxycarboxylic acids, lactones etc. each having two or more ester linkage-forming functional groups; various polyesters, various polyethers, various polycarbonates etc. composed of said various constituent components. Any of these can be used if the biodegradability of the resulting copolymer is excellent.

Examples of said dicarboxylic acids include succinic acid, adipic acid, azelaic acid, sebacic acid, terephthalic acid, isophthalic acid etc. These may be used solely or in combination thereof.

Examples of polyhydric alcohols are aromatic polyhydric alcohols having ethylene oxide added to bisphenol; aliphatic polyhydric alcohols such as ethylene glycol, propylene glycol, butanediol, hexane diol, octane diol, glycerin, sorbitan, trimethylolpropane, neopentyl glycol etc.; and ether glycols such as diethylene glycol, triethylene glycol, polyethylene glycol, polypropylene glycol etc. These may be used solely or in combination thereof.

Examples of hydroxycarboxylic acids include glycolic acid, hydroxybutylcarboxylic acid and those described in Japanese Laid-Open Patent Publication No. 6-184,417/1994. These may be used solely or in combination thereof.

Examples of lactones include glycolide, $\epsilon$-caprolactoneglycolide, $\epsilon$-caprolactone, $\beta$-propiolactone, $\delta$-butyrolactone, $\beta$- or $\gamma$- butyrolactone, pivalolactone, $\delta$-valerolactone, etc. These may be used solely or in combination thereof.

In the case of this copolymer of lactic acid, 50 mole-% or more lactic acid component is contained in the total monomers of the copolymer. If the lactic acid component is less than 50 mole-%, the melting point of the resulting copolymer is lowered so there is the tendency that sufficient thermal stability for obtaining molded articles cannot be obtained. More preferably, the copolymer of lactic acid contains 70 mole-% or more lactic acid component.

In particular, in the case where various polycarbonates are used as copolymerizable components, the copolymer of lactic acid preferably contains 0.1 to 5 weight-% polycarbonate component so that while maintaining transparency characteristic of the polylactic acid, its blend with said crosslinked polycarbonate can be given toughness without deteriorating mechanical characteristics.

If the polycarbonate component in the copolymer of lactic acid is less than 0.01% by weight, the copolymer of lactic acid is almost the same as a homopolymer of lactic acid. On the other hand, if the polycarbonate component is more than 5% by weight, the resulting lactic acid copolymer can maintain transparency, but a reduction in its molecular weight is inevitable, it becomes brittle, and it may be hard to obtain the effect of improving the impact resistance of the resulting polylactic acid type resin composition containing a polylactic acid and said crosslinked polycarbonate. A more preferable amount of the polycarbonate component in the copolymer of lactic acid is 0.1 to 3% by weight.

These copolymers of lactic acid may be random copolymers with copolymer components introduced randomly into polylactic acid chains or block copolymers with a block of copolymer components into polylactic acid chains.

In the present invention, the weight-average molecular weight of polylactic acid is generally 50,000 to 1,000,000, preferably 100,000 to 500,000. If the weight-average molecular weight is less than 100,000, the product is brittle, and it may be hard to obtain the effect of improving the impact resistance of the resulting lactic acid type resin composition containing the polylactic acid and said crosslinked polycarbonate.

The polylactic acid type resin composition of the present invention contains polylactic acid (PLA) and said crosslinked polycarbonate (PC) preferably at a blend ratio by weight of (PLA): (PC)=60:40 to 95:5. If the blend ratio of polylactic acid (PLA) is less than 60, the characteristics of the polylactic acid, that is, excellent mechanical strength, thermal stability and transparency are not apparent. On the other hand, if the blend ratio of said crosslinked polycarbonate (PC) is less than 5, its improving effect on the brittleness of the polylactic acid is weak. A more preferable blend ratio is in the range of (PLA):(PC)=50:50 to 90:10 by weight.

The process for producing the polylactic acid type resin composition according to the present invention is described as follows.

The polylactic acid type resin composition of the present invention can be easily produced by fusion-mixing the polylactic acid with said crosslinked polycarbonate. The method of mixing them is not particularly limited, and they can be mixed in any method known in the art. For example, a vertical reaction apparatus or a horizontal reaction apparatus provided with a single-head or multi-head stirrer, or a horizontal reaction apparatus provided with a single-head or multi-head scraper blade, or a reaction apparatus such as a single-head or multi-head kneader or extruder can be used solely or in combination by linking thereof.

The polylactic acid type resin composition of the present invention can also be produced by polymerization of the polylactic acid in the presence of said cross-linked polycarbonate. That is, a molten lactic acid or a lactide is mixed with a conventional polylactic acid polymerization catalyst such as tin compounds together with said crosslinked polycarbonate, and then polylactic acid polymerization is effected in a known method described in e.g. Japanese Laid-Open Patent Publication No. 59-96,123/1984 and 7-33,861/1995 whereby a polylactic acid composition containing said crosslinked polycarbonate component can be obtained. In this method, microscopic particles of said crosslinked polycarbonate can be dispersed in the polylactic acid so that the effect of said crosslinked polycarbonate as a modifier can be obtained effectively.

Fabrication of the polylactic acid type resin composition of the present invention obtained in the above method, similar to conventional plastics, can be carried out using a method such as injection molding, extrusion molding, vacuum forming, pressure forming etc. so that films, sheets, fibers, various vessels, various parts and other molded articles can be obtained in various shapes.

For example, in the case of extrusion molding, the temperature of an extruder is set at 140 to 210° C., and a specific mold is attached to the top of the extruder so that blow-film molding, sheet molding, pipe molding etc. can be effected. Injection molding and blow molding can be conducted with the cylinder temperature of a conventional molding machine being set at 140 to 210° C., Further various modifications to the polylactic acid type resin composition of the present invention can be effected by adding secondary additives. Examples of secondary additives include UV ray absorbers, pigments/dyes, coloring agents, various fillers, antistatic agents, releasing agents, stabilizers, perfumes, anti-microbial agents, nucleators or the like.

Further, molded articles composed of the polylactic acid type resin obtained in the present invention are excellent in biodegradability, thus contributing to a reduction in environmental disruption caused by disposal after use or from production processes. Their degradability in composts is particularly superior and almost all of them can be decomposed in a few months.

According to the present invention, a biodegradable polylactic acid type resin composition excellent in mechanical strength, elasticity and transparency applicable to packing materials, various molded articles etc. is provided because said crosslinked polycarbonate has been incorporated as a modifier for polylactic acid.

EXAMPLES

Hereinafter, the present invention is described in more detail with reference to Examples and Comparative Examples.

The weight-average molecular weight (Mw) of a polymer was determined in terms of polystyrene by use of HPLC manufactured by Shimadzu Corporation. Measurement of dynamic viscoelasticity was conducted according to a test (JIS K 7198) relating to temperature dependence of dynamic viscoelasticity by use of DVA-300 manufactured by Shimadzu Corporation. Measurement of glass transition temperature and melting point was conducted using scanning differential calorimeter DSC-50 manufactured by Shimadzu Corporation. Transparency was judged by visual observation.

In the tensile test, Autograph AC-100 kN manufactured by Shimadzu Corporation was used for measurement according to JIS K 7113. In the Izod impact test, measurement was conducted according to JIS K 7110 (with notch).

Examples 1 to 7 are synthetic examples of the crosslinked polycarbonates of the present invention.

Example 1

Synthesis of Crosslinked Polycarbonate A and A-II 66.6 g (0.25 mole) of a trimethylolpropane-EO adduct (compound having 3 moles of ethylene oxide added to 1 mole of trimethylolpropane, produced by Nippon Nyukazai K.K.), 202.8 g (2.25 moles) of 1,4-butanediol, 225.2 g (2.5 moles) of dimethyl carbonate and 0.95 g (0.005 mole) of 28% sodium methoxide in methanol as a catalyst were mixed in a glass reaction vessel equipped with a stirrer, a thermometer, a fractionating column etc., the mixture was maintained under normal pressure at 95° C. for 2 hours, the temperature was raised over 5 hours to 150° C., and the mixture was further heated at 150° C. for 4 hours, whereby methanol formed by reaction was distilled off.

Then, 42 g (0.47 mole) of 1,4-butanediol formed by polymerization reaction was distilled off by maintaining it at a temperature of 150 to 155° C. at a reduced pressure of 2 mmHg. The reaction mixture was cooled to room temperature, 250 ml of chloroform and 10 g of active china clay were added, and the mixture was stirred at 55° C. for 1 hour. It was cooled to room temperature, the active china clay was filtered, and the filtrate was concentrated and dried whereby 233 g of crosslinked polycarbonate A was obtained as white solid.

The melting point of this crosslinked polycarbonate A was 36° C., and the weight-average molecular weight by GPC was 13,900. As a result of proton NMR analysis, peaks corresponding to protons in —CH$_2$OCOO— were observed at 4.1 to 4.3 (Δ value, solvent: CDCl$_3$) as shown in the NMR chart in FIG. 1, so it was confirmed to be a polycarbonate. Further, none of peaks corresponding to protons in —OCOOCH$_3$ were observed, so the molecular terminal of the polymer was confirmed to be an OH group.

229.0 g of crosslinked polycarbonate A-II was obtained in the same manner as in the above synthetis except that 46 g (0.51 mole) of 1,4-butanediol formed by polymerization reaction was distilled off by maintaining it at a temperature of 150 to 155° C. at a reduced pressure of 2 mmHg. The weight-average molecular weight of this crosslinked polycarbonate A-II by GPC was 20,300.

Example 2

Synthesis of Crosslinked Polycarbonate D 26.6 g (0.1 mole) of a trimethylolpropane-EO adduct (compound having 3 moles of ethylene oxide added to 1 mole of trimethylolpropane, produced by Nippon Nyukazai K.K.), 129.8 g (0.9 mole) of 1,4-cyclohexane dimethanol, 94.6 g (1.05 moles) of dimethyl carbonate and 0.38 g (0.002 mole) of 28% sodium methoxide in methanol as a catalyst were mixed in a glass reaction vessel equipped with a stirrer, a thermometer, a fractionating column etc., the mixture was maintained under normal pressure at 105° C. for 2 hours, the temperature was raised over 6 hours to 160° C., and the mixture was further heated at 160° C. for 4 hours, whereby methanol formed by reaction was distilled off.

Then, 25.5 g (0.18 mole) of 1,4-cyclohexanedimethanol formed by polymerization reaction was distilled off by maintaining it at 160 to 170° C. under a reduced pressure of 1 mmHg. The reaction mixture was cooled to room temperature, 200 ml of chloroform and 4 g of active china clay were added, and the mixture was stirred at 55° C. for 1 hour. It was cooled to room temperature, the active china clay was filtrated, and the filtrate was concentrated and dried whereby 143.2 g of crosslinked polycarbonate D was obtained as white solid.

Figure 2:
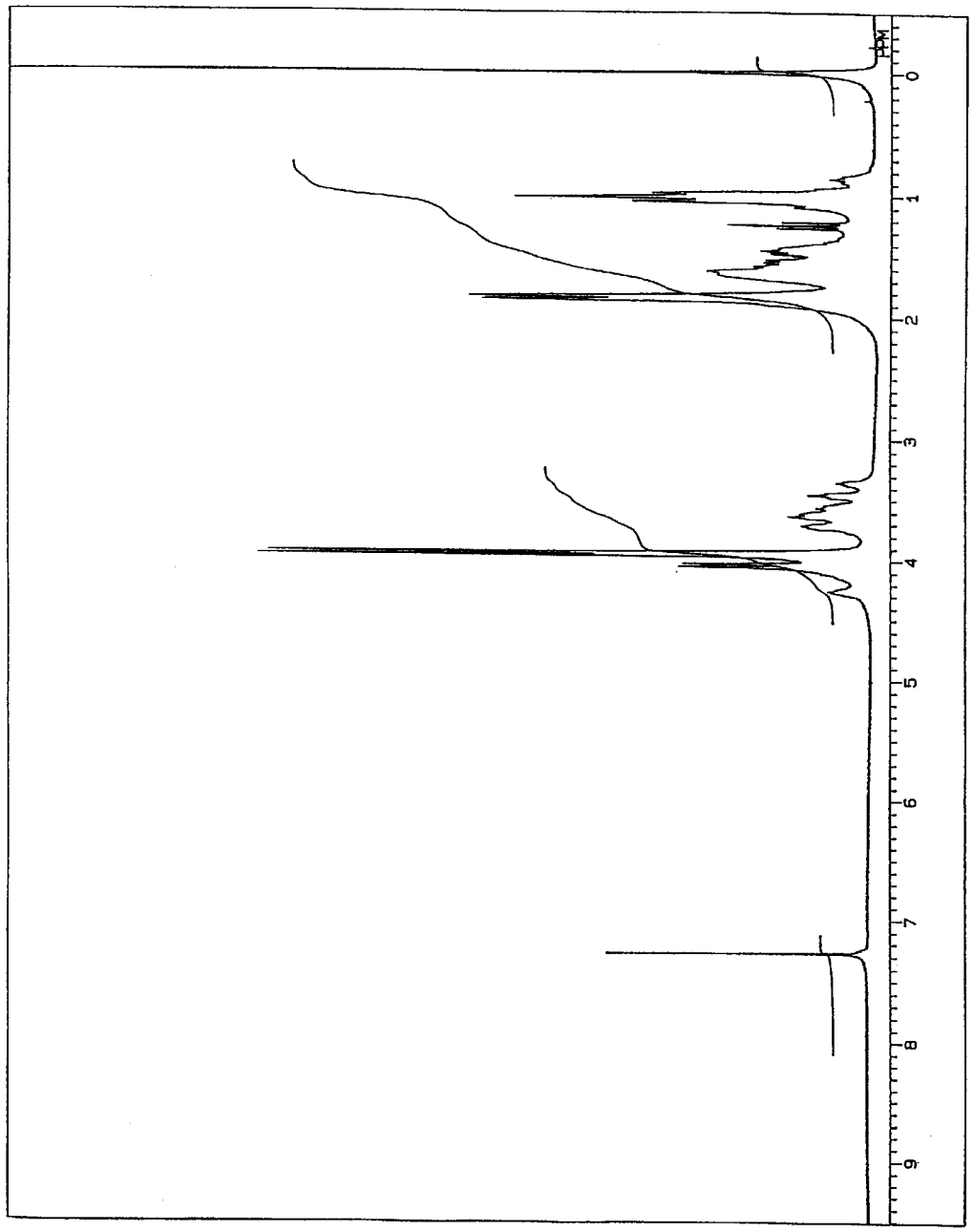
FIG. 2 is an NMR chart of crosslinked polycarbonate D obtained in Example 2.

The melting point of this crosslinked polycarbonate D was 86° C., and the weight-average molecular weight by GPC was 7,900. As a result of proton NMR analysis, peaks corresponding to protons in —$CH_2OCOO$— were observed at 3.9 to 4.3 ($\delta$ value, solvent: $CDCl_3$) as shown in the NMR chart in FIG. 2, so it was confirmed to be a polycarbonate. Further, none of peaks corresponding to protons in —$OCOOCH_3$ were observed, and the molecular terminal of the polymer was confirmed to be an OH group.

Example 3

Synthesis of Crosslinked Polycarbonate C 209.5 g of crosslinked polycarbonate C was obtained in the same manner as in Example 1 except that 238.8 g (2.25 moles) of diethylene glycol was used in place of 1,4-butanediol in Example 1 (47.5 g (0.45 mole) of diethylene glycol formed by polymerization reaction was distilled off).

Figure 3:
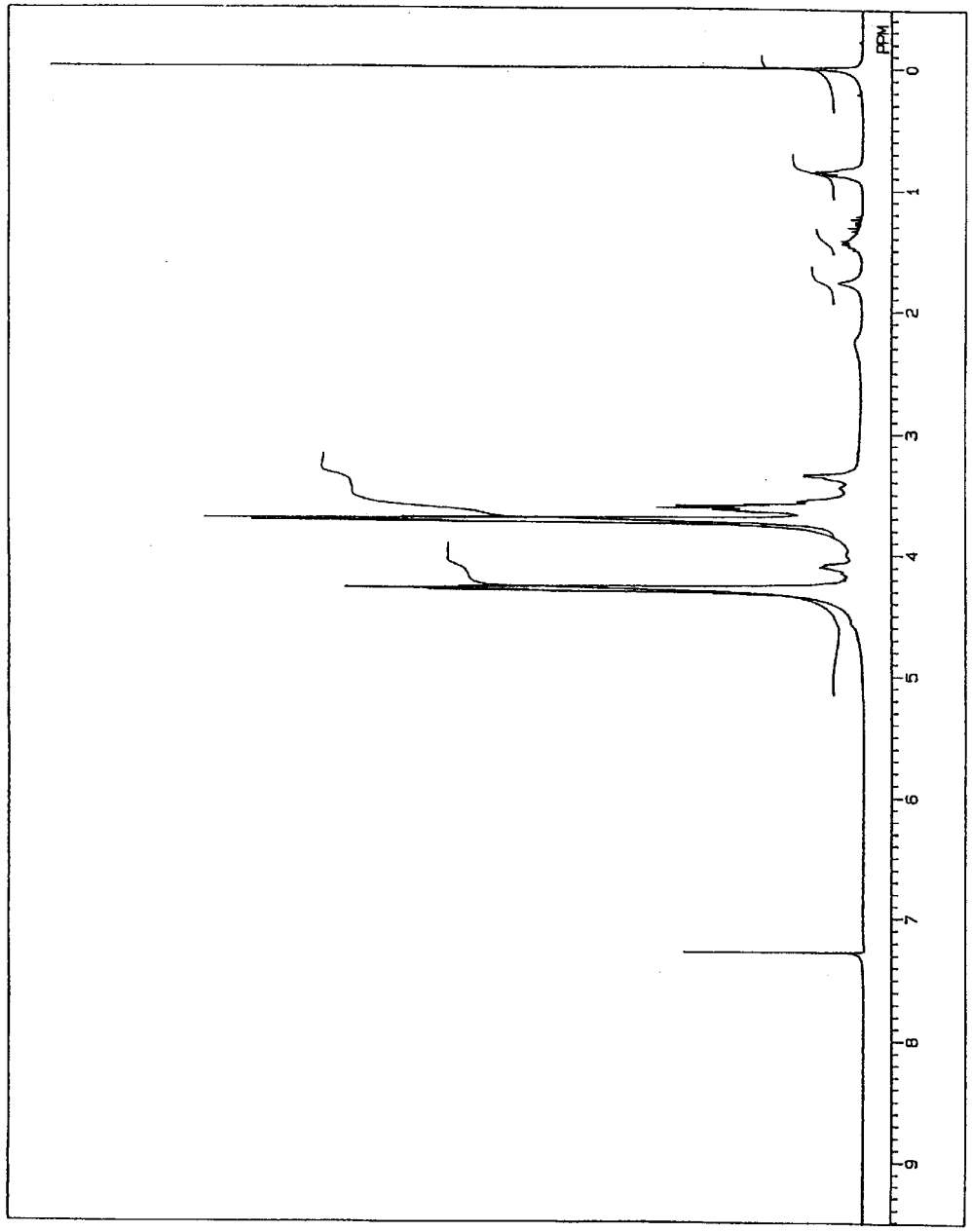
FIG. 3 is an NMR chart of crosslinked polycarbonate C obtained in Example 3.

This crosslinked polycarbonate C is liquid, and the weight-average molecular weight by GPC was 11,750. A proton NMR chart of this polymer is shown in FIG. 3.

Example 4

Synthesis of Crosslinked Polycarbonate F 241.5 g of crosslinked polycarbonate F was obtained in the same manner as in Example 1 except that 78.1 g (0.25 mole) of a pentaerythritol-EO adduct (compound having 4 moles of ethylene oxide added to 1 mole of pentaerythritol, produced by Nippon Nyukazai K.K.) was used in place of the trimethylolpropane-EO adduct (44.3 g (0.49 mole) of 1,4-butanediol formed by polymerization reaction was distilled off).

Figure 4:
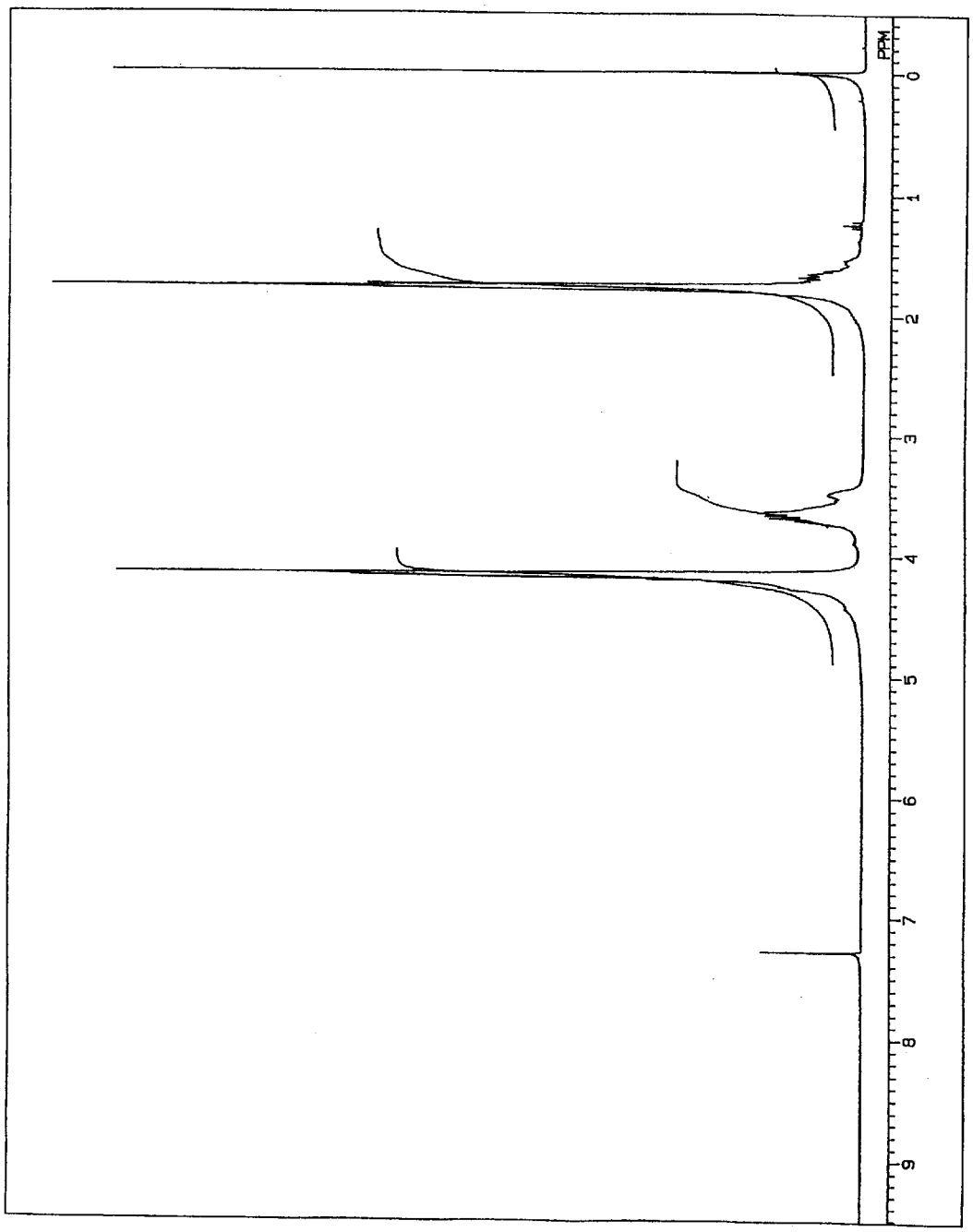
FIG. 4 is an NMR chart of crosslinked polycarbonate F obtained in Example 4.

This crosslinked polycarbonate F was liquid, and the weight-average molecular weight by GPC was 22,800. A proton NMR chart of this polymer is shown in FIG. 4.

Example 5

Synthesis of Crosslinked Polycarbonate E

The same materials as in Example 2 were charged in the same manner except that the amount of dimethyl carbonate was 135.1 g (1.5 moles). The mixture was maintained under normal pressure at 105° C. for 2 hours, the temperature was raised over 6 hours to 160° C., and the mixture was further heated at 160° C. for 4 hours, whereby methanol formed by reaction was distilled off.

Then, dimethyl carbonate formed by polymerization reaction was distilled off by maintaining it at 160° C. under a reduced pressure of 50 mmHg. The reaction mixture was cooled to room temperature, 200 ml of chloroform and 4 g of active china clay were added, and the mixture was stirred at 55° C. for 1 hour. It was cooled to room temperature, the active china clay was filtrated, and the filtrate was concentrated and dried whereby 153 g of crosslinked polycarbonate E was obtained as white solid.

Figure 5:
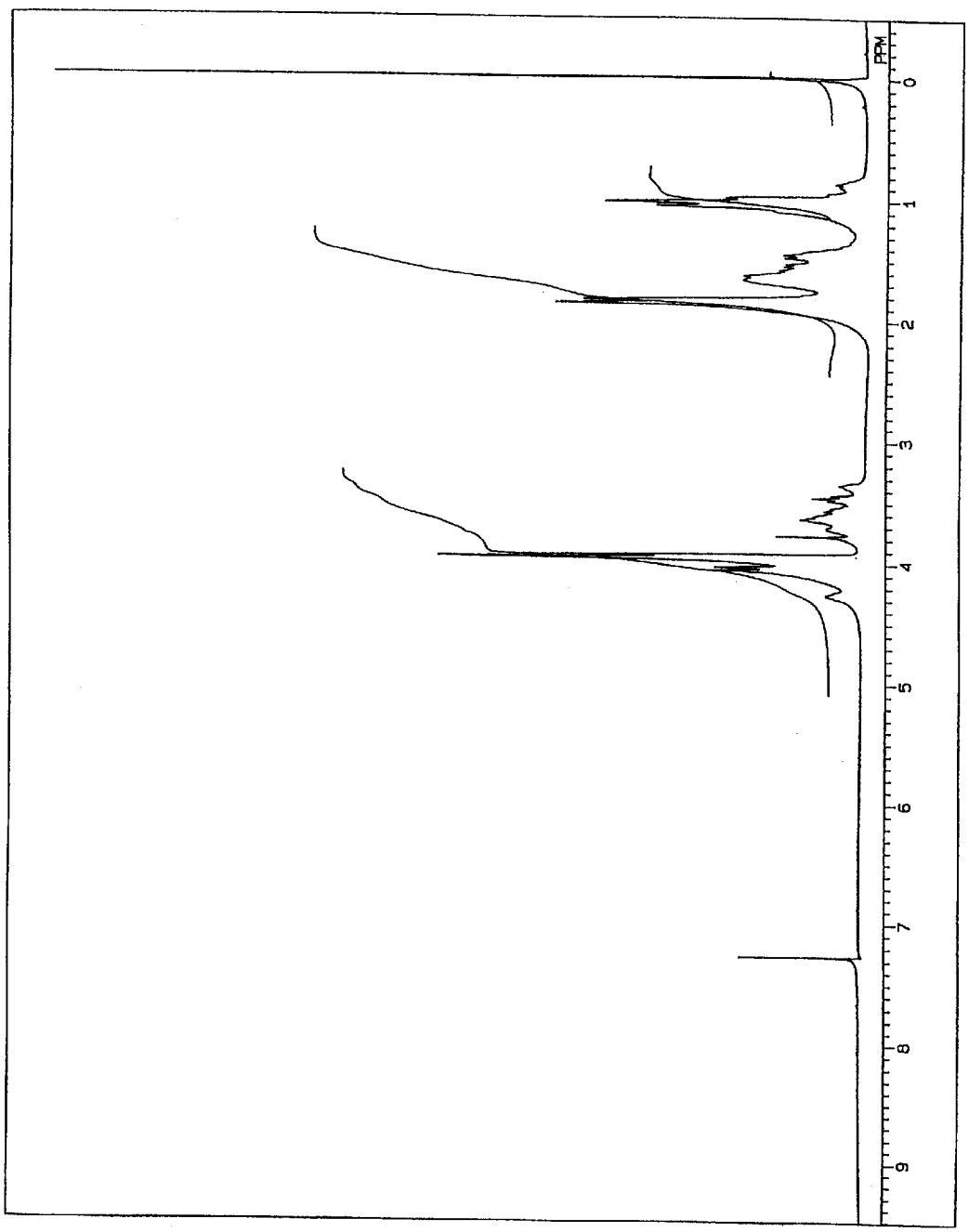
FIG. 5 is an NMR chart of crosslinked polycarbonate E obtained in Example 5.

The melting point of this crosslinked polycarbonate was 80° C., and the weight-average molecular weight by GPC was 9,800. As a result of proton NMR analysis, peaks corresponding to protons in —$CH_2OCOO$— were observed at 3.9 to 4.3 ($\delta$ value, solvent: $CDCl_3$) as shown in the NMR chart in FIG. 5, so it was confirmed to be a polycarbonate. Further, a peak corresponding to protons in —$OCOOCH_3$ was observed at 3.78, so it was found to be a methyl carbonate terminal.

Example 6

Synthesis of Crosslinked Polycarbonate B 122 g of white solid crosslinked polycarbonate B was obtained by synthesis and purification in the same manner as in Example 1 except that 33.3 g (0.125 mole) of the trimethylolpropane-EO adduct (produced by Nippon Nyukazai K.K.), 214.1 g (2.375 mole) of 1,4-butanediol, and 225.2 g (2.5 moles) of dimethyl carbonate were used.

The melting point of this crosslinked polycarbonate B is 44.5° C., and the weight-average molecular weight by GPC was 19,600.

Example 7

Synthesis of Crosslinked Polycarbonate G 39.9 g (0.15 mole) of the trimethylolpropane-EO adduct (produced by Nippon Nyukazai K.K.), 140.6 g (1.35 moles) of neopentyl glycol, 212.8 g (2.6 moles) of dimethyl carbonate, and 1.5 g (0.008 mole) of 28% sodium methoxide in methanol as a catalyst were mixed in a glass reaction vessel equipped with a stirrer, a thermometer, a fractionating column etc., the mixture was maintained under normal pressure at 95° C. for 2 hours, the temperature was raised over 5 hours to 150° C., and the mixture was further heated at 150° C. for 4 hours, whereby methanol formed by reaction was distilled off.

Then, dimethyl carbonate formed by polymerization reaction was distilled off by maintaining it at 150° C. while reducing the pressure from normal pressure to 50 mmHg. The reaction mixture was cooled to room temperature, 300 ml of chloroform and 15 g of active china clay were added, and the mixture was stirred at 55° C. for 1 hour. It was cooled to room temperature, the active china clay was filtrated, and the filtrate was concentrated and dried whereby 183 g of crosslinked polycarbonate G was obtained as white solid.

The melting point of this crosslinked polycarbonate G was 76.2° C., and the weight-average molecular weight by GPC was 19,800.

Comparative Synthesis Example 1

Synthesis of Polylactic Acid/Crosslinked Polycarbonate Copolymer H 99 g of lactide and 1 g of crosslinked polycarbonate A obtained in Example 1 were molten in a nitrogen atmosphere, then 0.2 g of tin octylate was added as a polymerization catalyst, and the mixture was polymerized at 190° C. for 20 minutes under stirring in a two-head stirring machine.

This copolymer was treated at 120° C. at a pressure of 1.5 kg/cm$^2$ in nitrogen for 12 hours, and the unreacted lactide was distilled off (evaporated) whereby 80 g of copolymer H was obtained.

The melting point of this copolymer H was 172° C., the weight-average molecular weight by GPC was 261,000, and the content of the remaining lactide was less than 0.1% by weight.

Comparative Synthesis Example 2

Synthesis of Straight-Chain Polycarbonate I 45.1 g (0.5 mole) of 1,4-butanediol, 45.0 g (0.5 mole) of dimethyl carbonate, and 0.95 g (0.005 mole) of 28% sodium methoxide in methanol as a catalyst were mixed in a glass reaction vessel equipped with a stirrer, a thermometer, a fractionating column etc., the mixture was maintained under normal pressure at 95° C. for 2 hours, the temperature was raised over 5 hours to 150° C., and the mixture was further heated at 150° C. for 4 hours, whereby methanol formed by reaction was distilled off.

Then, 1,4-butanediol formed by polymerization reaction was distilled off by maintaining it at 150° C. under a reduced pressure of 1 mmHg. The reaction mixture was cooled to room temperature, 100 ml of chloroform and 5 g of active china clay were added, and the mixture was stirred at 55° C. for 1 hour. It was cooled to room temperature, the active china clay was filtrated, and the filtrate was concentrated and dried whereby 38.1 g of crosslinked polycarbonate I was obtained as white solid.

The melting point of this crosslinked polycarbonate I was 62.8° C., and the weight-average molecular weight by GPC was 9,600.

Comparative Synthesis Example 3

Synthesis of Straight-Chain Polycarbonate J

White solid polycarbonate J was obtained in the same manner as in Comparative Synthetic Example 2 except that 58.1 g (0.5 mole) of 1,4-cyclohexanediol was used in place of 1,4-butanediol. The melting point of polycarbonate J was 147.7° C. and the weight-average molecular weight by GPC was 2,800.

Comparative Synthesis Example 4

Synthesis of Straight-Chain Polycarbonate K

White solid polycarbonate K was obtained in the same manner as in Comparative Synthetic Example 2 except that a mixture of 22.5 g (0.25 mole) of 1,4-butanediol and 60.1 g (0.25 mole) of 4,4'-isopropylidene dicyclohexanol was used in place of 45.1 g of 1,4-butanediol. The melting point of polycarbonate K was 84.4° C. and the weight-average molecular weight by GPC was 6,700.

Examples 8 to 17 are production examples of the polylactic acid compositions of the present invention.

Example 8

140 g of polylactic acid (Lacty® with a melting point of 175° C. and a weight-average molecular weight 200,000, a product of Shimadzu Corporation) and 60 g of the crosslinked polycarbonate A obtained in Example 1 were introduced into a two-head stirring machine (Kurimoto Seisakusho K.K.) kept at 190° C., fusion-mixed for 10 minutes, and removed to give a strand which was then cooled with water and cut into pellets. As a measurement by DSC, its melting point was 171° C.

The pellets were subjected to hot pressing (185° C., 150 kgf/cm$^2$, 3 minutes) to give a transparent sheet of 0.3 mm in thickness. A rectangular sample of 5 mm in width and 3 cm in length was cut off from this sheet and measured for its dynamic viscoelasticity (frequency of 10 Hz, a raising temperature of 5° C./min.). As a result, as shown in FIG. 6, a loss tangent tan δ peak ($8 \times 10^{-2}$) appeared at about −45° C., indicating excellent impact resistance in use at normal temperature.

Figure 6:
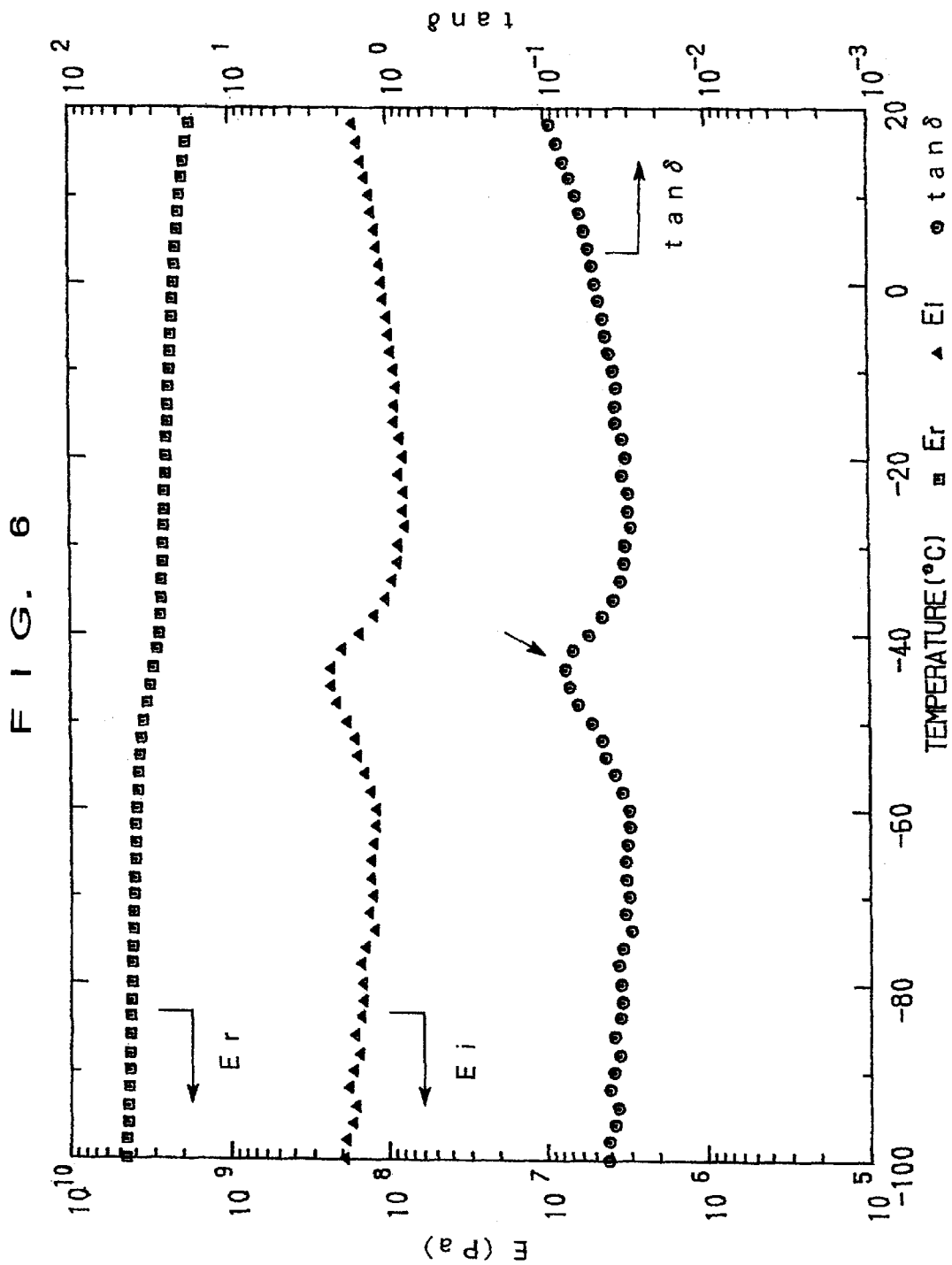
FIG. 6 is a graph showing the result of dynamic viscoelasticity measurement in Example 8.

FIG. 6 is a graph showing the result of dynamic viscoelasticity measurement in Example 8, where temperature is given in the abscissa (° C). In the ordinate, degree of elasticity E (Pa) is given in the left, showing storage elastic modulus Er (Pa) and loss elastic modulus Ei (Pa). In the ordinate in the right, loss tangent tan δ (=Er/Ei) is given. The foregoing applies to graphs in FIGS. 7, 8 and 9 below.

Example 9

Pellets were obtained by fusion-melting in the same manner as in Example 8 except that the amount of blended Lacty was 160 g and the amount of the crosslinked polycarbonate A of Example 1 was 40 g.

As a result of DSC measurement, its melting point was 170° C.

A transparent sheet was obtained from the pellets by hot pressing in the same manner as in Example 8, and a sample was cut off from this sheet and measured for its dynamic viscoelasticity. As a result, a tan δ peak ($4 \times 10^{-2}$) appeared at about −45° C. This peak was relatively low than in the case of the 30% polycarbonate blend in Example 8, but indicated excellent impact resistance for use at normal temperature.

Example 10

Pellets were obtained by fusion-mixing at 185° C. in the same manner as in Example 8 except that 140 g of polylactic acid/crosslinked polycarbonate copolymer H obtained in Comparative Synthetic Example 1 and 60 g of crosslinked polycarbonate A in Example 1 were used. As a result of DSC measurement, its melting point was 170° C.

A transparent sheet was obtained from the pellets by hot pressing in the same manner as in Example 8, and a sample was cut off from this sheet and measured for its dynamic viscoelasticity. As a result, a tan δ peak ($1 \times 10^{-1}$) appeared at about −45° C., indicating excellent impact resistance for use at normal temperature.

Example 11

Pellets were obtained by fusion-mixing in the same manner as in Example 8 except that crosslinked polycarbonate B obtained in Example 6 was used. As a result of DSC measurement, its melting point was 171° C.

A transparent sheet was obtained from the pellets by hot pressing in the same manner as in Example 8, and a sample was cut off from this sheet and measured for its dynamic viscoelasticity. As a result, a tan δ peak ($4 \times 10^{-2}$) appeared at about −45° C., indicating excellent impact resistance for use at normal temperature.

Example 12

Pellets were obtained by fusion-mixing in the same manner as in Example 8 except that crosslinked polycarbonate C obtained in Example 3 was used. As a result of DSC measurement, its melting point was 171° C.

Figure 7:
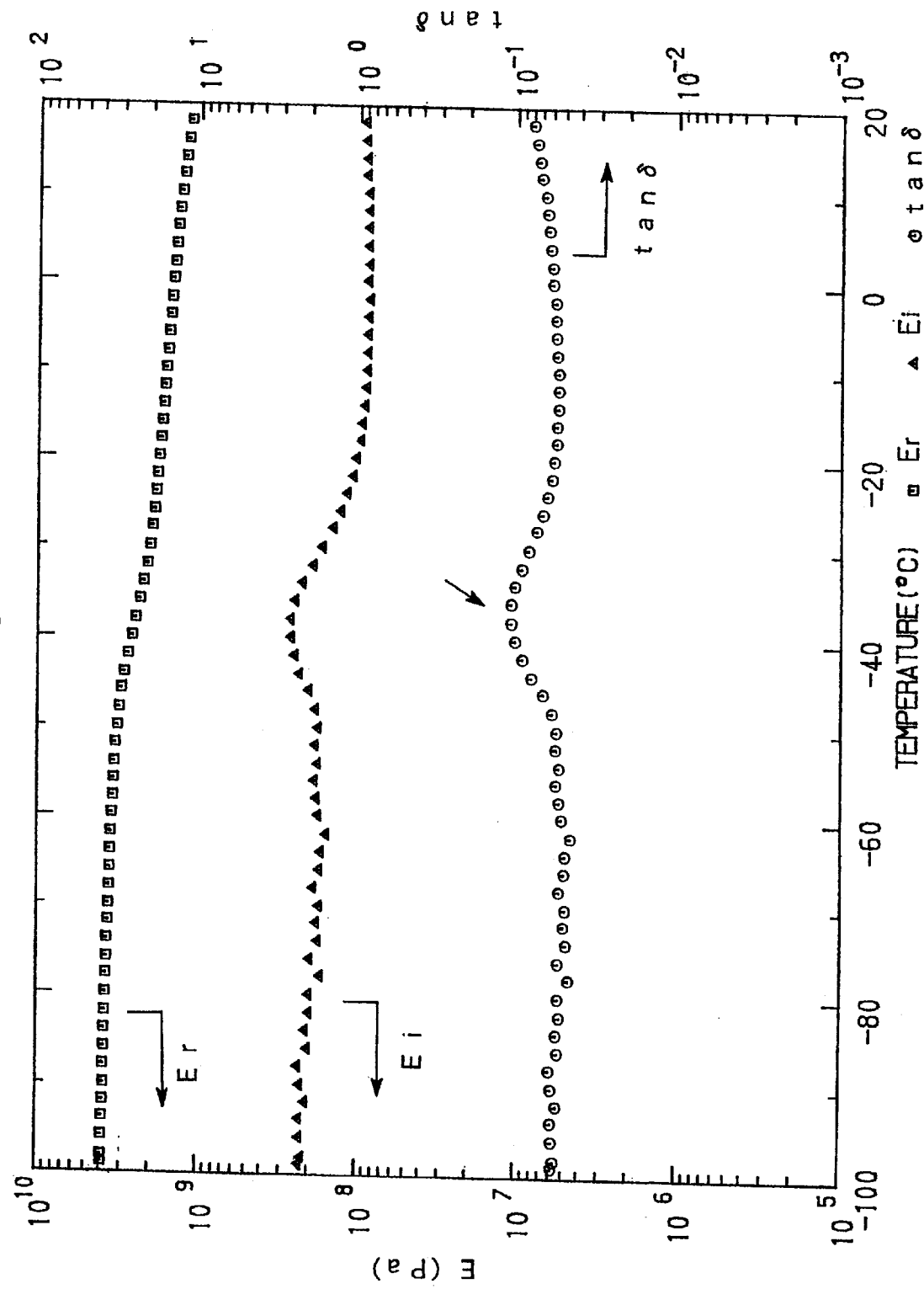
FIG. 7 is a graph showing the result of dynamic viscoelasticity measurement in Example 12.

A transparent sheet was obtained from the pellets by hot pressing in the same manner as in Example 8, and a sample was cut off from this sheet and measured for its dynamic viscoelasticity. As a result, a tan δ peak ($1\times10^{-1}$) appeared at about −35 to −40° C. as shown in FIG. 7, indicating excellent impact resistance for use at normal temperature.

Example 13

Pellets were obtained by fusion-mixing in the same manner as in Example 8 except that crosslinked polycarbonate D obtained in Example 2 was used. As a result of DSC measurement, its melting point was 170° C.

Figure 8:
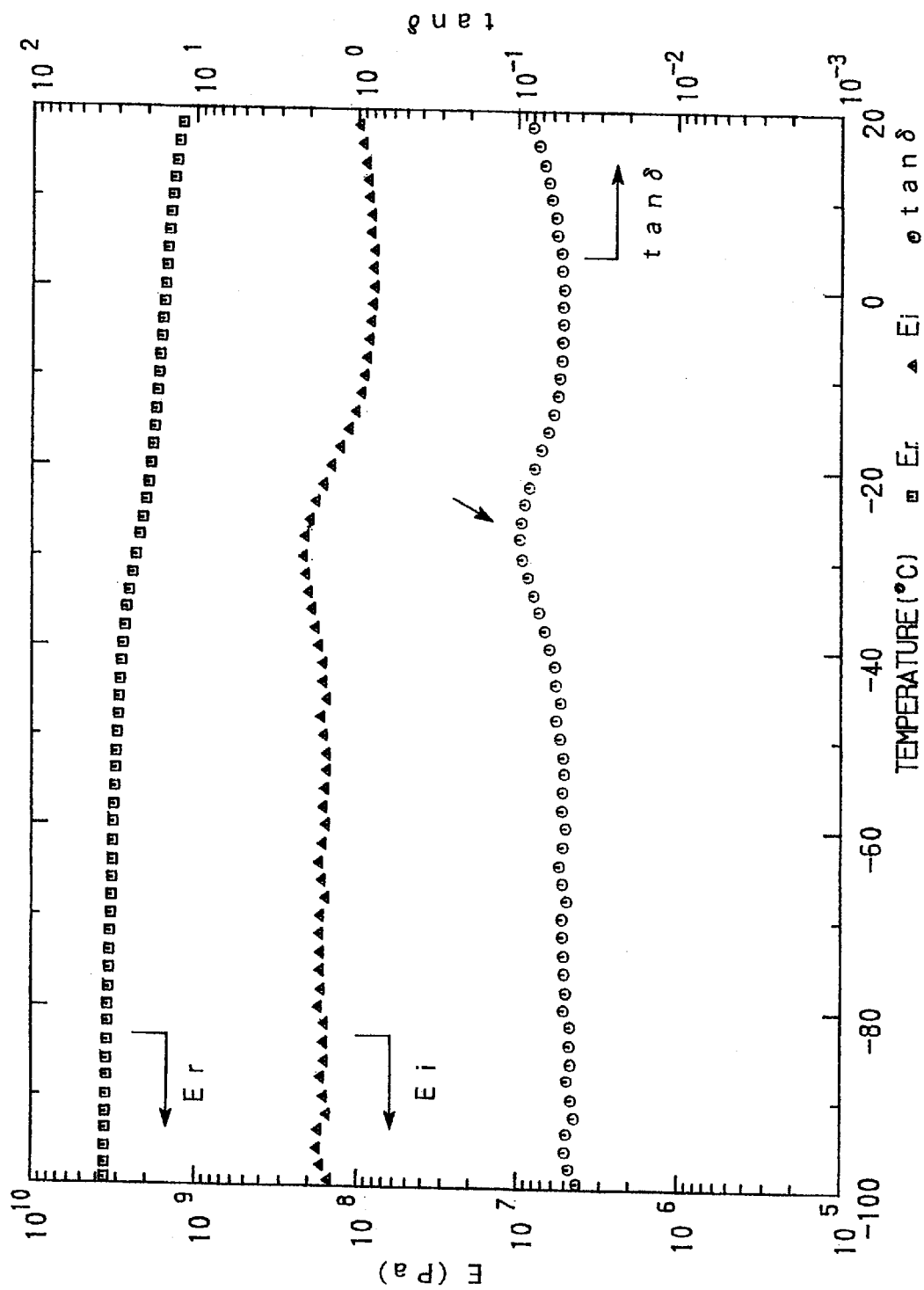
FIG. 8 is a graph showing the result of dynamic viscoelasticity measurement in Example 13.

A transparent sheet was obtained from the pellets by hot pressing in the same manner as in Example 8, and a sample was cut off from this sheet and measured for its dynamic viscoelasticity. As a result, a peak of tan δ ($1\times10^{-1}$) appeared at about −25 to −30° C. as shown in FIG. 8, indicating excellent impact resistance for use at normal temperature.

Example 14

Pellets were obtained by fusion-mixing in the same manner as in Example 8 except that crosslinked polycarbonate F obtained in Example 4 was used. As a result of DSC measurement, its melting point was 166.6° C.

A transparent sheet was obtained from the pellets by hot pressing in the same manner as in Example 8, and a sample was cut off from this sheet and measured for its dynamic viscoelasticity. As a result, a tan δ peak ($8\times10^{-2}$) appeared at about −35 to −40° C., indicating excellent impact resistance for use at normal temperature.

Example 15

Pellets were obtained by fusion-mixing in the same manner as in Example 8 except that crosslinked polycarbonate G obtained in Example 7 was used. As a result of DSC measurement, its melting point was 170.1° C.

A transparent sheet was obtained from the pellets by hot pressing in the same manner as in Example 8, and a sample was cut off from this sheet and measured for its dynamic viscoelasticity. As a result, a tan δ peak ($1\times10^{-1}$) appeared at about −30° C., indicating excellent impact resistance for use at normal temperature.

Example 16

Pellets were obtained by fusion-mixing in the same manner as in Example 8 except that crosslinked polycarbonate E obtained in Example 5 was used. As a result of DSC measurement, its melting point was 170.7° C.

A transparent sheet was obtained from the pellets by hot pressing in the same manner as in Example 8, and a sample was cut off from this sheet and measured for its dynamic viscoelasticity. As a result, a tan δ peak ($1\times10^{-1}$) appeared at about −28° C. as shown in FIG. 9, indicating excellent impact resistance for use at normal temperature.

Further, the above pellets were injection-molded into a tensile strength test sample and an Izod impact sample. As a result of its tensile strength test, the tensile modulus was 3.45 GPa to confirm its toughness. The breaking extension was 22.9%, and as a result of its Izod impact test, its impact resistance was 4.0 kgf·cm/cm$^2$, indicating significant improvement as compared with 2.7 kgf·cm/cm$^2$ determined for polylactic acid (homopolymer).

Example 17

Pellets were obtained by fusion-mixing in the same manner as in Example 8 except that crosslinked polycarbonate A-II obtained in Example 1 was used. As a result of DSC measurement, its melting point was 172.0° C.

A transparent sheet was obtained from the pellets by hot pressing in the same manner as in Example 8, and a sample was cut off from this sheet and measured for its dynamic viscoelasticity. As a result, a tan δ peak ($9\times10^{-2}$) appeared at about −28° C. as shown in FIG. 10, indicating excellent impact resistance for use at normal temperature.

Further, the above pellets were injection-molded into a tensile strength test sample and an Izod impact sample. As a result of its tensile strength test, the tensile modulus was 2.66 GPa to confirm its toughness. The breaking extension was 9.2%, and as a result of its Izod impact test, its impact resistance was 9.6 kgf·cm/cm$^2$, indicating significant improvement as compared with 2.7 kgf·cm/cm$^2$ determined for polylactic acid (homopolymer).

Comparative Example 1

Pellets were obtained by fusion-mixing in the same manner as in Example 8 except that crosslinked polycarbonate I obtained in Comparative Synthetic Example 2 was used. As a result of DSC measurement, two melting points i.e. 60° C. and 176° C. were obtained.

A transparent sheet was obtained from the pellets by hot pressing in the same manner as in Example 8, and a sample was cut off from this sheet and measured for its dynamic viscoelasticity. As a result, a small tan δ peak appeared at about −35° C., indicating improvement in impact resistance over the sole polylactic acid, but this improvement effect was lower than in Examples 8 to 17.

Comparative Example 2

Pellets were obtained by fusion-mixing in the same manner as in Example 8 except that crosslinked polycarbonate K obtained in Comparative Synthetic Example 4 was used. As a result of DSC measurement, its melting point was 170° C.

A transparent sheet was obtained from the pellets by hot pressing in the same manner as in Example 8, and a sample was cut off from this sheet and measured for its dynamic viscoelasticity. As a result, in a low-temperature range, there hardly occurred tan δ peaks, indicating improvement in impact resistance over the sole polylactic acid, but this improvement effect was lower than in Examples 8 to 17.

Comparative Examples 3 to 6

90 g of lactide, and 10 g of each of crosslinked polycarbonate A (Comparative Example 3), polycarbonate I (Comparative Example 4), polycarbonate J (Comparative Example 5) and a polycarbonate of 1,6-hexanediol (RAVECARB 106® with a weight-average molecular weight of 9,800, a product of Lutemix Co., Ltd.) (Comparative Example 6) were used to synthesize polylactic acid/polycarbonate copolymers respectively in the same manner as in Comparative Synthesis Example 1 to prepare the respective copolymer pellets. Each hot press sheet was obtained from the respective pellets in the same manner as in Example 8.

The weight-average molecular weight, melting point and evaluation of each copolymer thus obtained are collectively shown in Table 1. In Comparative Example 5, polycarbonate J could not be fusion-mixed with the lactide, so no copolymer could be obtained. In Comparative Examples 3, 4, and 6, transparent copolymers could be obtained, but their molecular weights were low and they were very brittle.

TABLE 1

|  | Comparative Example 3 | Comparative Example 4 | Comparative Example 5 | Comparative Example 6 |
|---|---|---|---|---|
| polycarbonate | A | I | J | RAVECARB 106 |
| Mw | 83 × 10³ | 41 × 10³ | — | 73 × 10³ |
| mp (° C.) | 163 | 168 | — | 173 |
| transparency | transparent | transparent | — | transpatent |
| remark | brittle | brittle | not obtained | brittle |

The present invention can be practiced in various other embodiments without departure from the sprit or major characteristics thereof. Accordingly, the above-described examples are described merely for illustrative purposes and should not be interpreted as limiting. Further, any modifications of an equivalent scope to the claims are within the scope of the present invention.

What is claimed is:

1. A crosslinked polycarbonate prepared by polycondensation of:
   (A) a diol;
   (B) a trivalent or more polyhydric alcohol whose arbitrary two hydroxy groups are not in the positional relationship of 1,2-disubstitution or 1,3-disubstitution, said alcohol (B) being a polyhydric alcohol adduct formed from the addition of at least n moles of at least one of ethylene oxide and propylene oxide to one mole of a polyhydric alcohol having n hydroxy groups, wherein n is an integer of at least 3; and
   (C) a carbonyl component selected from the group consisting of carbonic acid diesters, phosgene and equivalents thereof.

2. The crosslinked polycarbonate according to claim 1, wherein the trihydric or more polyhydric alcohol (B) is polyhydric alcohol (B) having at least one molecule of ethylene oxide and/or propylene oxide added to each of n hydroxyl groups possessed by n-hydric or more polyhydric alcohol, wherein n is an integer of 3 or more.

3. The crosslinked polycarbonate according to claim 2, wherein the trihydric or more polyhydric alcohol (B) is polyhydric alcohol (B) having at least one molecule of ethylene oxide and/or propylene oxide added to each of hydroxyl groups of at least one polyhydric alcohol selected from the group consisting of trimethylolpropane, trimethylolethane, pentaerythritol, ditrimethylolpropane, dipentaerythritol, glycerin and sorbitol.

4. The crosslinked polycarbonate according to claim 3, wherein diol (A) is a diol represented by the general formula (I):

HO—R—OH (I)

wherein R is a C4 to C20 alkylene group, may contain an ether linkage, or may have formed a ring structure.

5. The crosslinked polycarbonate according to claim 4, wherein the molar ratio of diol (A) and trivalent or more polyhydric alcohol (B) in the polymer is in the range of (A):(B)=40:60 to 99:1.

6. The crosslinked polycarbonate according to claim 5, wherein the weight-average molecular weight is 2,000 to 100,000.

7. A process for producing a crosslinked polycarbonate, comprising conducting polycondensation of:
   (A) a diol;
   (B) a trivalent or more polyhydric alcohol whose arbitrary two hydroxy groups are not in the positional relationship of 1,2-disubstitution or 1,3-disubstitution, said alcohol (B) being a polyhydric alcohol adduct formed from the addition of at least n moles of at least one of ethylene oxide and propylene oxide to one mole of a polyhydric alcohol having n hydroxy groups, wherein n is an integer of at least 3; and
   (C) a carbonyl component selected from the group consisting of carbonic acid diesters, phosgene and equivalents thereof.

8. The process for producing a crosslinked polycarbonate according to claim 7, wherein diol (A) and trihydric or more polyhydric alcohol (B) are reacted at a molar ratio in the range of (A):(B)=50:50 to 99:1.

9. A polylactic acid type resin composition comprising a polylactic acid and a crosslinked polycarbonate comprising a polycarbonate derived from polycondensation of:
   (A) a diol;
   (B) a polyhydric alcohol having at least three hydroxy groups whose arbitrary two groups are not in the positional relationship of 1,2-disubstitution or 1,3-disubstitution; and
   (C) a carbonyl component selected from the group consisting of carbonic acid diesters, phosgene and equivalents thereof.

10. The polylactic acid type resin composition according to claim 9, wherein the polylactic acid (PLA) and the crosslinked polycarbonate (PC) are contained at a ratio of (PLA):(PC)=60:40 to 95:5 by weight.

11. The polylactic acid type resin composition according to claim 10, wherein the polylactic acid is a lactic acid homopolymer or copolymer with a weight-average molecular weight of 100,000 to 1,000,000 containing 50 to 100 mole-% of a lactic acid component.

12. The polylactic acid type resin composition according to claim 10, wherein the polylactic acid is a lactic acid copolymer with a weight-average molecular weight of 100,000 to 1,000,000 containing 0.01 to 5% by weight of a polycarbonate component.

13. A process for producing the polylactic acid type resin composition comprising a polylactic acid and a crosslinked polycarbonate of claim 9, comprising fusion-mixing a polylactic acid with the crosslinked polycarbonate.

14. A process for producing the polylactic acid type resin composition comprising a polylactic acid and a crosslinked polycarbonate of claim 9, comprising conducting polymerization of a polylactic acid in the presence of the crosslinked polycarbonate.

15. A film, sheet, fiber, various vessel, various part, or other molded article formed from the polylactic acid type resin composition of claim 9.

16. The crosslinked polycarbonate according to claim 1 wherein said polyhydric alcohol is a polyhydric alcohol adduct derived from three molecules of ethylene oxide and one molecule of trimethylolpropane.

17. The crosslinked polycarbonate according to claim 1 wherein said polyhydric alcohol is a polyhydric alcohol adduct derived from four molecules of ethylene oxide and one molecule of pentaerythritol.

18. The crosslinked polycarbonate according to claim 1 wherein said diol (A) is 1,4-butanediol, neopentyl glycol or 1,4-cyclohexanedimethanol.

19. The process for producing a crosslinked polycarbonate according to claim 7 wherein said diol (A) is a diol represented by the general formula (I):

HO—R—OH (I)

wherein R is a C4 to C20 alkylene group, linear or cyclic, which may include an ether linkage.

20. A crosslinked polycarbonate comprising a polycarbonate derived from polycondensation of:

(A) a diol represented by the general formula (I):

HO—R—OH (I)

wherein R is a C4 to C20 alkylene group, linear or cyclic, which may include an ether linkage;

(B) a polyhydric alcohol having at least three hydroxy groups whose arbitrary two groups are not in the positional relationship of 1,2-disubstitution or 1,3-disubstitution; and (C) a carbonyl component selected from the group consisting of carbonic acid diesters, phosgene and equivalents thereof.

21. A process for producing a crosslinked polycarbonate comprising conducting polycondensation by reacting together:

(A) a diol represented by the general formula (I):

HO—R—OH (I)

wherein R is a C4 to C20 alkylene group, linear or cyclic, which may include an ether linkage;

(B) a polyhydric alcohol having at least three hydroxy groups whose arbitrary two groups are not in the positional relationship of 1,2-disubstitution or 1,3-disubstitution; and (C) a carbonyl component selected from the group consisting of carbonic acid diesters, phosgene and equivalents thereof.

22. The crosslinked polycarbonate according to claim 1, wherein said diol (A) is a diol represented by the general formula (I):

HO—R—OH (I)

wherein R is a C4 to C20 alkylene group, linear or cyclic, which may include an ether linkage.

* * * * *